United States Patent Office 2,823,233
Patented Feb. 11, 1958

2,823,233
QUATERNARY SALTS OF SUBSTITUTED DIPHENYLALKANOIC ACID AMIDES

Merrill Eugene Speeter, Kalamazoo, Mich., assignor to Bristol Laboratories Inc., Syracuse, N. Y., a corporation of New York No Drawing. Application March 8, 1954
Serial No. 414,871

6 Claims. (Cl. 260—558)

This invention relates to a new class of organic compounds of therapeutic value and methods for the preparation thereof. More particularly, this invention relates to quaternary salts of substituted diphenylalkanoic acid amides.

This application is a continuation-in-part of my prior, copending application, Serial No. 185,162, filed September 15, 1950, and now abandoned.

Bockmühl and Ehrhart, German Patent 731,560, disclose several amides which are stated to have antispasmodic activity. Speeter, U. S. Patent 2,647,926, also discloses an amide and its acid addition salts stated to have therapeutic value.

There is now discovered, according to the present invention, a new class of compounds of the general formula:

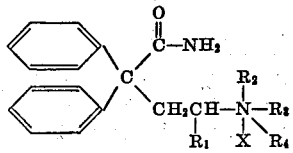

wherein $R_1$ represents a member selected from the group consisting of hydrogen and methyl; $R_2$ and $R_3$ each represent a member selected from the group consisting of alkyl groups containing one to four carbon atoms and, when taken together with the nitrogen atom, represent a member selected from the group consisting of piperidyl, morpholinyl, pyrrolidyl and pipecolyl; $R_4$ represents a member selected from the group consisting of benzyl and alkyl containing one to eighteen carbon atoms; and X represents one equivalent of an anion selected from the group consisting of chloride, bromide, iodide, alkyl sulfate and aryl sulfonate in ionic linkage with the nitrogen atom.

The compounds of the present invention possess therapeutic utility by virtue of their lack of toxicity and their ability to suppress gastric secretion of acid and to dilate the pupil of the eye.

The compounds of the present invention may be prepared by causing an appropriate basic amide to react with an alkyl halide, an aralkyl halide, an alkyl sulfate, or an aryl sulfonate. The compound in which X represents chloride may be conveniently prepared by causing the corresponding iodide to react with silver chloride, filtering off the silver iodide and recovering the desired quaternary chloride from the filtrate.

The basic amides from which the quaternary salts are derived can be prepared conveniently by the general procedure exemplified by the preparation of alpha, alpha-diphenyl-gamma-diethylaminobutyramide, as follows:

A stirred mixture of 386.5 g. (2 moles) of diphenyl acetonitrile and 46.5 g. (2.03 moles) of lithium amide in 750 ml. of benzene was slowly brought to boiling. After refluxing the mixture for two hours a dried solution of 2.09 moles of beta-diethylaminoethyl chloride (prepared by the method of Slotta and Behnisch, Ber., 68, 754 (1935)), in 600 ml. of benzene was added at a rate to maintain gentle reflux. After boiling the mixture overnight (15 hours) enough water was cautiously added to destroy all excess lithium amide and to dissolve all solid material, and the benzene layer was extracted with one 700 ml. and four 150 ml. portions of 6 N hydrochloric acid. Neutralization of the cooled acid extracts with 50% sodium hydroxide solution, followed by extraction with ether and drying of this extract over anhydrous potassium carbonate, and distillation yielded 454 g. (77.5%) of alpha, alpha-diphenyl-gamma-diethylaminobutyronitrile as a yellow oil; B. P. 199–203° C./6 mm. Over a twenty-minute period 212 g. (0.68 mole) of the above nitrile was added to a stirred mixture of 340 ml. of concentrated sulfuric acid and 34 ml. of water, the temperature being kept below 90° C. The stirred mixture was heated for two hours on the steam bath, poured onto crushed ice, and neutralized with concentrated ammonium hydroxide. The white precipitate was filtered, washed with water and dissolved in chloroform. This solution was washed in turn with 5% sodium hydroxide, water and saturated sodium chloride solution and was then dried over anhydrous potassium carbonate and the chloroform was removed by distillation. Recrystallization of the residue from petroleum ether (B. P. 85–100° C.) followed by an additional recrystallization from isopropanol gave 190 g. (90.5%) of alpha, alpha-diphenyl-gamma-diethylaminobutyramide; M. P. 91–92.5° C.

Additional information on intermediates and methods of preparation of the compounds of the present invention is given in J. Organic Chemistry, vol. 17, pages 770–777 (1952).

The basic nitriles useful for hydrolysis to amides from which the quaternary salts are derived can be prepared by one of two methods. Typical examples of each method are given below followed by tabulation of physical properties of certain of these nitriles.

METHOD A 5-diethylamino-4,4-dimethyl-2,2-diphenylvaleronitrile.—Diphenylacetonitrile (42.5 grams) and lithium amide (5.1 grams) are stirred in refluxing toluene (300 ml.) for three hours. To this mixture is added dropwise a solution of γ-diethylaminoneopentyl chloride in 200 ml. of toluene, which has been prepared by stirring 47.3 grams of γ-diethylaminoneopentyl chloride hydrochloride with 30 ml. of 56% potassium hydroxide and extracting the liberated basic alkyl chloride into the toluene. The reaction mixture is then stirred and refluxed overnight. After cooling, water is added to dissolve the lithium chloride and the aqueous layer is discarded. The toluene layer is washed twice with dilute hydrochloric acid, the acid extracts basified with alkali and the basic mixture extracted several times with ether. The ether extracts are combined, dried, and distilled. There is obtained 48.2 grams of 5-diethylamino-4,4-dimethyl-2,2-diphenylvaleronitrile.

METHOD B

α,α-Diphenyl-ω-(1-piperidyl) capronitrile.—A mixture of 212.5 grams of diphenylacetonitrile and 27.8 grams of lithium amide in 1.7 liters of toluene is heated under reflux for four hours. The resulting red suspension is added portionwise to a stirred and refluxing solution of 288 grams of 1,4-dichlorobutane in 300 ml. of toluene. After completion of the addition, the reaction mixture is stirred and refluxed overnight. The cooled mixture is washed several times with water and dilute hydrochloric acid; the washings are discarded. The toluene layer is dried and the solvent evaporated, finally under reduced pressure to remove any unreacted 1,4-dichlorobutane. There remains 200 grams of crude ω-chloro-α,α-diphenylcapronitrile as a red oil.

Seventy grams of piperidine and 117.5 grams of crude ω-chloro-α,α-diphenylcapronitrile are heated together in 250 ml. of refluxing toluene for 16 hours. The cooled reaction mixture is washed with water, then extracted

TABLE I.—BASIC NITRILES $$\underset{R}{\overset{C_6H_5}{\diagdown}}\underset{C_nH_{2n}-NR'_2}{\overset{CN}{\diagup}}$$

| R | $C_nH_{2n}$ | —NR'$_2$ | Meth. | Yield, percent | B. P., °C. | Pres., mm. kg. | M. P. or $n_D^{25}$ | Formula | Analyses Carbon Cald. | Carbon Fnd. | Hydrogen Cald. | Hydrogen Fnd. |
|---|---|---|---|---|---|---|---|---|---|---|---|---|
| C$_6$H$_5$ | —(CH$_2$)$_4$— | —NC$_5$H$_{10}$ | B | 45 | 200–205 | 1.0 | 81.5–83.5 | C$_{23}$H$_{28}$N$_2$ | ---- | ---- | ---- | ---- |
| C$_6$H$_5$ | —(CH$_2$)$_5$— | —N(C$_2$H$_5$)$_2$ | B | 16 | 190–197 | 2.5 | | C$_{23}$H$_{30}$N$_2$ | ---- | ---- | ---- | ---- |
| C$_6$H$_5$ | —(CH$_2$)$_6$— | —N(C$_2$H$_5$)$_2$ | B | 27 | 197–204 | 1.0 | 1.5372 | C$_{24}$H$_{32}$N$_2$ | 82.7 | 81.9 | 9.3 | 9.1 |
| C$_6$H$_5$ | —(CH$_2$)$_6$— | —NC$_5$H$_{10}$ | B | 36 | 231–240 | 3.0 | | C$_{25}$H$_{32}$N$_2$ | 83.3 | 83.0 | 9.0 | 9.2 |
| C$_6$H$_5$ | —CH$_2$—C(CH$_3$)$_2$—CH$_2$— | —N(CH$_3$)$_2$ | A | 73 | | | 139.0–141.5 | C$_{21}$H$_{26}$N$_2$·HCl | 73.6 | 73.3 | 7.9 | 7.8 |
| C$_6$H$_5$ | —CH$_2$—C(CH$_3$)$_2$—CH$_2$— | —N(C$_2$H$_5$)$_2$ | A | 66 | 170–176 | 2.5 | 46.0–50.0 | C$_{23}$H$_{30}$N$_2$ | 82.6 | 82.6 | 9.0 | 9.2 |
| C$_6$H$_5$ | —CH$_2$—C(CH$_3$)$_2$—CH$_2$— | —NC$_5$H$_{10}$ | A | 61 | 183–186 | 2.0 | 66.0–68.0 | C$_{24}$H$_{30}$N$_2$ | 83.2 | 83.0 | 8.7 | 8.9 |
| H | —CH$_2$—C(CH$_3$)$_2$—CH$_2$— | —NC$_5$H$_{10}$ | A | 76 | 161–165 | 1.0 | 1.5150 | C$_{15}$H$_{26}$N$_2$ | 80.0 | 80.1 | 9.7 | 9.8 |
| CH$_3$ | —CH$_2$—CH$_2$— | —N(CH$_3$)$_2$ | A | 55 | 121–127 | 2.0 | 1.5086 | C$_{13}$H$_{18}$N$_2$·HCl | 65.4 | 65.8 | 8.0 | 8.3 |
| C$_2$H$_5$ | —CH$_2$—CH$_2$— | —N(C$_2$H$_5$)$_2$ | A | 58 | 126–130 | 1.0 | 1.4966 | C$_{16}$H$_{24}$N$_2$ | 78.6 | 77.6 | 9.9 | 10.1 |
| C$_4$H$_9$ | —CH$_2$—CH$_2$— | —N(C$_2$H$_5$)$_2$ | A | 44 | 149–158 | 1.3 | 1.4970 | C$_{18}$H$_{28}$N$_2$ | 79.4 | 78.7 | 10.4 | 10.5 |
| C$_6$H$_9$ | —CH$_2$—CH$_2$— | —N(CH$_3$)$_2$ | A | 69 | 156–162 | 2.0 | 1.5338 | C$_{18}$H$_{24}$N$_2$ | 80.5 | 80.0 | 9.0 | 9.2 |
| C$_6$H$_{11}$ | —CH$_2$—CH$_2$— | —N(CH$_3$)$_2$ | A | 60 | 174–177 | 1.0 | 1.5236 | C$_{18}$H$_{28}$N$_2$ | 79.9 | 79.8 | 9.7 | 9.6 |
| C$_6$H$_5$CH$_2$ | —CH$_2$—CH$_2$— | —NC$_5$H$_{10}$ | A | 33 | | | .92–0–94.0 | C$_{22}$H$_{26}$N$_2$ | 82.9 | 82.8 | 8.2 | 8.0 |
| p-ClC$_6$H$_4$ | —CH$_2$—CH$_2$— | —NC$_5$H$_{10}$ | A | 32 | | | 226.0–228.0 | C$_{21}$H$_{23}$ClN$_2$·HCl | 67.2 | 67.6 | 6.4 | 6.6 |
| α-C$_5$H$_4$N | —CH$_2$—CH$_2$— | —N(CH$_3$)$_2$ | A | 81 | 165–168 | 0.6 | | C$_{17}$H$_{19}$N$_3$ | 77.0 | 78.0 | 7.2 | 7.6 |
| α-C$_5$H$_4$N | —CH$_2$—CH$_2$— | —N(C$_2$H$_5$)$_2$ | A | 78 | 173–180 | 0.9 | | C$_{19}$H$_{23}$N$_3$ | 77.8 | 77.5 | 7.9 | 8.0 | twice with dilute hydrochloric acid. The aqueous extracts are basified with alkali and the liberated basic nitrile extracted into chloroform. The extracts are combined, dried, and distilled. There is obtained 86 grams of ω-(1-piperidyl)-α,α-diphenylcapronitrile.

The following examples will serve to illustrate the invention without limiting it thereto.

*Example 1.—Gamma-carbamyl-gamma, gamma-diphenylpropyl (diethyl)-methylammonium iodide isopropylate*

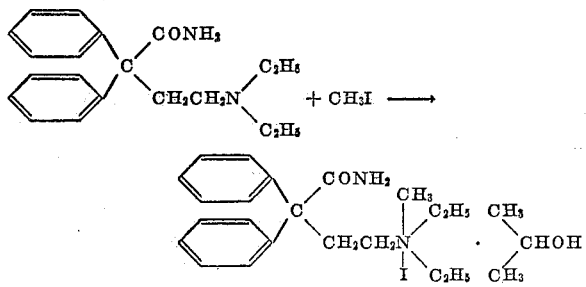

To a solution of 10 g. of alpha, alpha-diphenyl-gamma-diethylamino-butyramide in 150 ml. of ethanol was added 10 g. of methyl iodide. In two hours crystals began to separate. After standing for twenty-four hours, the mixture was cooled in ice and the crystals were collected by filtration. Two recrystallizations from methanol-isopropanol produced crystals melting at 98–100° C.; yield, 10 g.

*Analysis.*—Calculated for C$_{21}$H$_{29}$IN$_2$O·(CH$_3$)$_2$CHOH:

| | Calculated | Found |
|---|---|---|
| C | 56.26 | 56.34 |
| H | 7.27 | 6.96 |

*Example 2.—(Gamma - carbamyl - gamma, gamma-diphenylpropyl) trimethylammonium iodide*

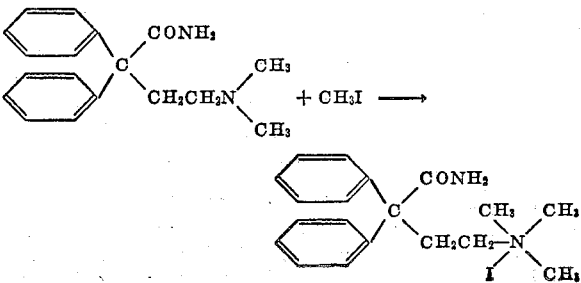

10 grams of alpha, alpha-diphenyl-gamma-dimethylaminobutyramide were dissolved in 120 ml. of ethyl alcohol and treated with 10 g. of methyl iodide. The mixture was stoppered and allowed to stand at room tempertaure. In about thirty minutes crystals began to separate. After four hours had elapsed, the mixture was chilled in ice and the crystals were collected by filtration. The salt melted at 206–207° C. after recrystallization from isopropanol. Recrystallization from methanol raised the melting point of the methiodide to 207–208° C.; yield, 12.5 g.

*Analysis.*—Calculated for C$_{19}$H$_{25}$IN$_2$O:

| | Calculated | Found |
|---|---|---|
| C | 53.77 | 53.21 |
| H | 5.93 | 5.83 |

Treatment of this same base with methyl chloride yielded solid, crystalline (gamma-carbamyl-gamma, gamma-diphenyl-propyl)-trimethylammonium chloride.

*Example 3.—1-(gamma-carbamyl-gamma, gamma-diphenylpropyl)-1-methylpiperidinium iodide*

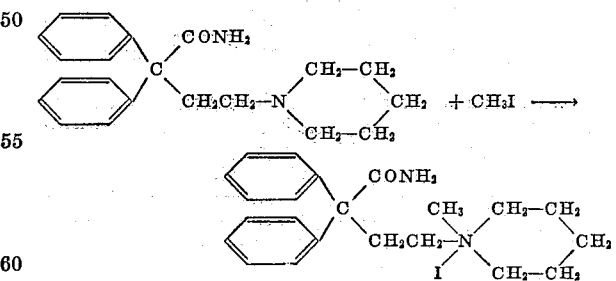

A mixture of 10 g. of alpha, alpha-diphenyl-gamma-(1-piperidyl) butyramide, 10 g. of methyl iodide and 200 ml. of isopropanol was allowed to stand for two days at room temperature. The removal of excess methyl iodide and isopropanol by distillation under diminished pressure left a solid residue which was recrystallized from isopropanol-methanol to obtain 8 g. of crystals melting at 201–202° C.

*Analysis.*—Calculated for C$_{22}$H$_{29}$IN$_2$O:

| | Calculated | Found |
|---|---|---|
| C | 56.89 | 56.75 |
| H | 6.29 | 6.18 |

10 g. of alpha, alpha-diphenyl-gamma-(1-piperidyl)-butyramide, 10 g. of methyl bromide and 200 ml. of isopropanol were mixed at 0° C. in a pressure-tight container, which was then closed and allowed to stand ten days at room temperature. The removal of excess methyl bromide and isopropyl alcohol by distillation under reduced pressure left a solid residue which was recrystallized from alcohol to give crystalline 1-(gamma-carbamyl-gamma, gamma-diphenylpropyl) - 1 - methylpiperidinium bromide.

*Example 4. — (Gamma - carbamyl - gamma, gamma - diphenylpropyl) - triethylammonium iodide*

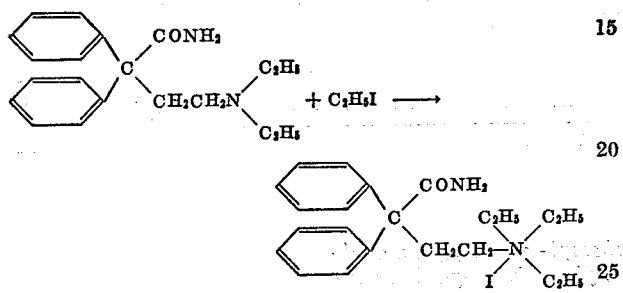

Five and eight-tenths gram (0.018 mole) of alpha, alpha-diphenyl-gamma-diethylaminobutyramide was dissolved in 50 ml. of absolute methanol, 10 g. (0.063 mole) of ethyl iodide was added and the mixture was refluxed for 21.5 hours. The solvent was removed under reduced pressure and the residual brown gum was recrystallized twice from absolute ethanol to a constant M. P. of 182–183.5° C. (bubbles).

Analysis.—Calculated for $C_{22}H_{31}IN_2O$:

|   | Calculated | Found |
|---|---|---|
| C | 56.6 | 56.8 |
| H | 6.70 | 6.94 |

*Example 5.—1-(Gamma-carbamyl-gamma-phenylpropyl)-1-methylpiperidinium iodide*

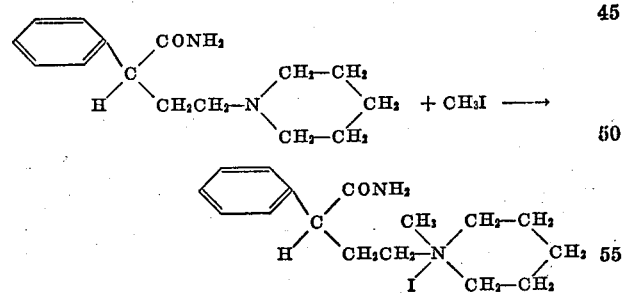

One-tenth mole (24.6 grams) of gamma-(1-piperidyl)-alpha-phenyl-butyramide was dissolved in 100 ml. of warm isopropyl alcohol. The solution was cooled to room temperature and 10 ml. of methyl iodide added. An exothermic reaction occurred, and soon a heavy oil separated from the solution. The oil gradually solidified, and was collected by filtration. The crude methiodide amounted to 36.5 grams (94% yield), M. P. 168–180° C. Several recrystallizations from isopropyl alcohol containing a little water raised the melting point to 188–190° C. The yield of recrystallized material was 27.7 grams.

Analysis.—Calculated for $C_{16}H_{25}IN_2O$:

|   | Calculated | Found |
|---|---|---|
| C | 49.5 | 50.1 |
| H | 6.5 | 6.6 |

*Example 6.—Gamma-carbamyl-gamma-cyclohexyl-gamma-phenylpropyl-(dimethyl)ethylammonium iodide*

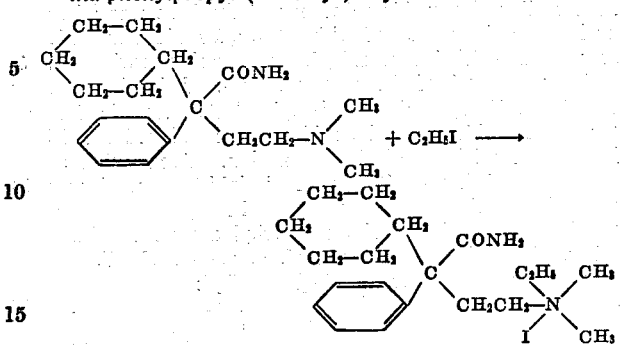

Ten and five-tenths grams (0.035 mole) of alpha-cyclohexyl - alpha - phenyl - gamma - dimethylaminobutyramide and 10.9 g. (0.070 mole) of ethyl iodide were dissolved in 60 ml. of absolute methanol and refluxed for nineteen hours. Removal of the solvent and excess ethyl iodide under diminished pressure left a brown gum which set up to a yellow solid when cooled and scratched.

Two crystallizations from water gave 10.2 g. of white crystals; M. P. 187–191° C. (bubbles).

Analysis.—Calculated for $C_{19}H_{33}IN_2O$:

|   | Calculated | Found |
|---|---|---|
| C | 54.1 | 54.2 |
| H | 7.48 | 7.58 |

*Example 7.—Gamma-carbamyl-gamma, gamma-diphenylpropyl-(diethyl)methyl-ammonium iodide*

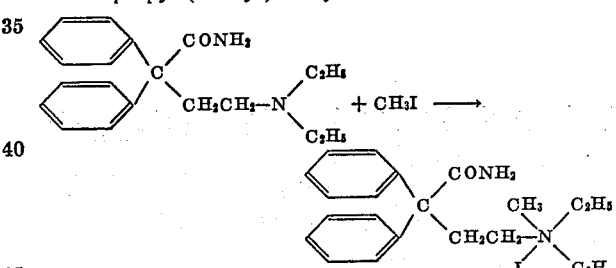

Five and two-tenths grams (0.016 mole) of alpha, alpha-diphenyl-gamma-diethylaminobutyramide and 5.0 g. (0.035 mole) of methyl iodide were dissolved in 70 ml. of dry isopropanol. Crystals began to separate after an hour of standing at room temperature and the reaction was completed by refluxing two hours.

On cooling 6.4 g. of yellow crystals of M. P. 164–6° C. (sint. 90° C.) were obtained. Two recrystallizations from acetone gave colorless crystals; M. P. 159–160° C. (bubbles).

Analysis.—Calculated for $C_{21}H_{29}IN_2O$:

|   | Calculated | Found |
|---|---|---|
| C | 55.8 | 55.8 |
| H | 6.46 | 6.54 |

*Example 8.—4-(gamma-carbamyl - gamma, gamma - diphenylpropyl)-4-ethylmorpholinium ethyl sulfate*

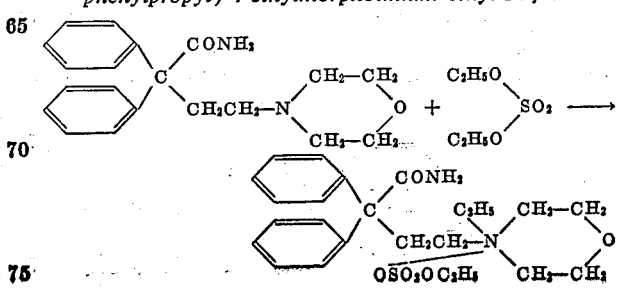

Five grams of alpha, alpha-diphenyl-gamma-(4-morpholinyl)-butyramide hydrochloride was neutralized with 50% sodium hydroxide solution and the base was taken up in chloroform, washed with saturated sodium chloride solution and dried over anhydrous potassium carbonate.

After removal of the solvent 50 ml. of dry benzene and 4.6 g. (0.030 mole) of diethyl sulfate were added to the white residue and the mixture was refluxed for 16 hours with calcium chloride protection. Decantation of the benzene left a small amount of pinkish gum. It was washed three times with dry ether and recrystallized from absolute ethanol by addition of ethyl acetate to obtain 2.3 g. of well-formed crystals; M. P. 170–171.5° C.

Analysis.—Calculated for $C_{24}H_{34}N_2O_6S$:

|  | Calculated | Found |
|---|---|---|
| C | 59.1 | 59.4 |
| H | 7.16 | 7.06 |

A solution of 2.0 g. (0.006 mole) of alpha-phenyl-alpha-(p-chlorophenyl)-gamma-piperidyl butyramide and 4.0 g. of methyl iodide in 150 ml. of absolute methanol was refluxed for two hours after standing for twenty-four hours at room temperature.

The solvent was removed under diminished pressure, leaving a brown, amorphous solid. This was dissolved in water but came down as a gum on cooling. When this gum was dissolved in isopropanol and diluted with anhydrous ether a small amount of a white solid was obtained which decomposed over a wide range (115–130° C.).

Analysis.—Calculated for $C_{22}H_{28}ClIN_2O$:

|  | Calculated | Found |
|---|---|---|
| C | 53.0 | 52.9 |
| H | 5.65 | 5.78 |

Example 9.—1-(gamma - carbamyl - gamma, gamma - diphenylpropyl) - 1-methyl-2-pipecolinium-p-toluenesulfonate

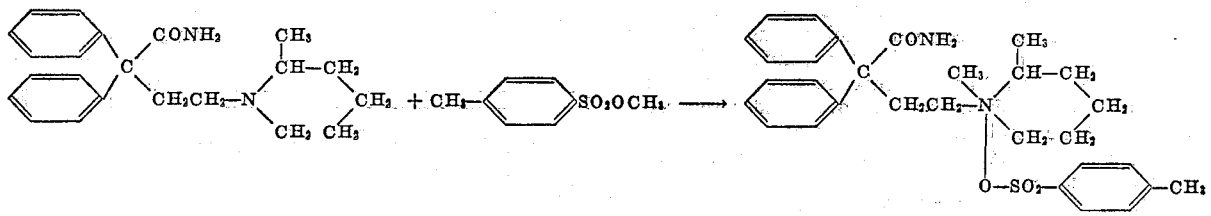

A mixture of 1.2 g. of alpha, alpha-diphenyl-gamma-2-pipecolylbutyramide, 3 g. of methyl p-toluenesulfonate and 30 ml. of dry benzene was refluxed overnight while protected from atmospheric moisture. After cooling, the solvent was decanted from a viscous oil on the bottom of the flask. The oil was dissolved in a minimum of absolute alcohol, treated with decolorizing charcoal, and filtered. Dilution of the filtrate to turbidity with ethyl acetate and subsequent cooling caused colorless crystals (0.6 g.) to slowly separate from solution. After desiccation in vacuo at room temperature, a sample of the water-soluble salt gave the following analysis. M. P. 170–176° C. (dec.)

Analysis.—Calculated for $C_{30}H_{38}N_2O_4S$:

|  | Calculated | Found |
|---|---|---|
| C | 68.9 | 68.2 |
| H | 7.26 | 7.24 |

Example 10.—1 - (gamma - carbamyl - gamma - p - chlorophenyl - gamma - phenylpropyl) - 1 - methylpiperidinium iodide

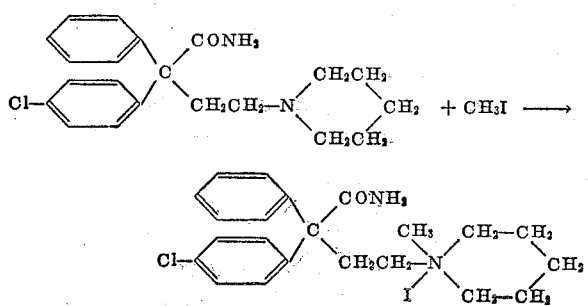

Example 11.—Gamma - carbamyl - gamma, gamma - diphenylpropyl (dimethyl)-ethylammonium iodide

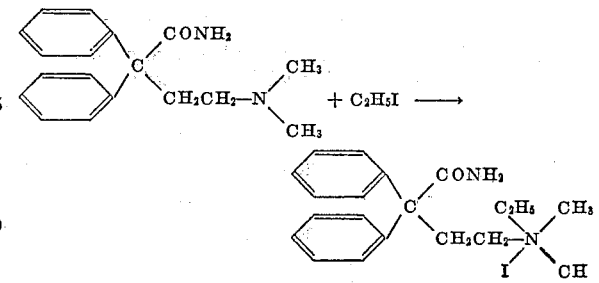

Three and seven-tenths grams (0.011 mole) of alpha, alpha - diphenylgamma - dimethylaminobutyramide hydrochloride was treated with an excess of 50% sodium hydroxide solution and the liberated base was taken up in chloroform. This extract was dried over anhydrous magnesium sulfate, filtered and the solvent removed, leaving a theoretical yield of base.

The base was dissolved in 50 ml. of dry isopropanol, 3 g. (0.019 mole) of ethyl iodide was added and the solution was refluxed for 4.5 hours. Cooling yielded crystals which upon recrystallization from isopropanol melted at 169–171° C. (preliminary melting at 113–116° C. and resolidification).

Analysis.—Calculated for $C_{20}H_{27}IN_2O$:

|  | Calculated | Found |
|---|---|---|
| C | 54.8 | 54.8 |
| H | 6.21 | 6.68 |

Treatment of this same base with ethyl chloride yielded solid, crystalline (gamma-carbamyl-gamma, gamma-diphenylpropyl)-(dimethyl)ethylammonium chloride.

Example 12.—1 - (gamma - carbamyl - gamma - phenyl-propyl) - 1 - benzylpiperidinium chloride

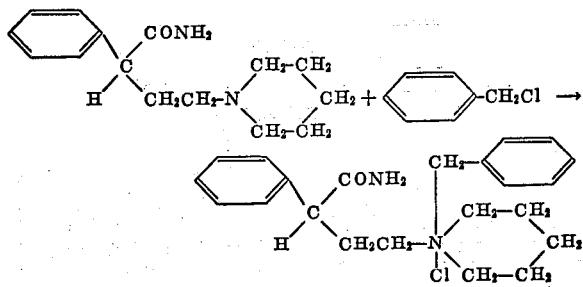

A mixture of 12.3 g. (0.05 mole) of alpha-phenyl-gamma-(1-piperidyl)butyramide, 7.6 g. (0.06 mole) of benzyl chloride and 50 ml. of isopropyl alcohol was heated under reflux for four hours. Dilution of the warm reaction mixture with ethyl acetate followed by cooling caused 12.0 g. (64.5% yield) of white solid, M. P. 155–162° C., to separate. Recrystallization from methanol-ether afforded 10.6 g. of colorless crystals, M. P. 156.5–161° C. which soften at about 150° C.

Example 13.—1-(gamma-carbamyl-gamma, gamma-diphenylpropyl)-1-ethylpyrrolidinium ethyl sulfate, hemihydrate

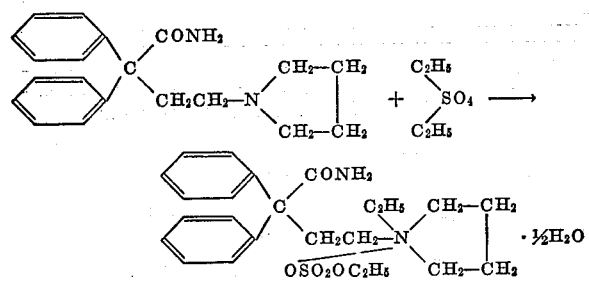

A mixture of 3 g. (0.01 mole) alpha, alpha-diphenyl-gamma-(1-pyrrolidyl)-butyramide, 30 ml. of dry benzene and 3 ml. (3.54 g.) (0.023 mole) of diethyl sulfate was refluxed for four hours while protected from atmospheric moisture, then cooled and the solvent was decanted from the viscous light brown oil. The product was dissolved in hot absolute alcohol, filtered and diluted with ethyl acetate until turbidity developed. Cooling caused the crystallization of material which was recrystallized from the same solvent combination to obtain 0.85 g. of product which softened at about 105° C. and melted at 130–133° C.

Analysis.—Calculated for $C_{24}H_{34}N_2O_5S \cdot \frac{1}{2}H_2O$:

|   | Calculated | Found |
|---|---|---|
| C | 61.1 | 61.3 |
| H | 7.47 | 7.23 |

Example 14.—1-benzl-1-(gamma-carbamyl-gamma, gamma-diphenylpropyl)-piperidinium bromide monohydrate

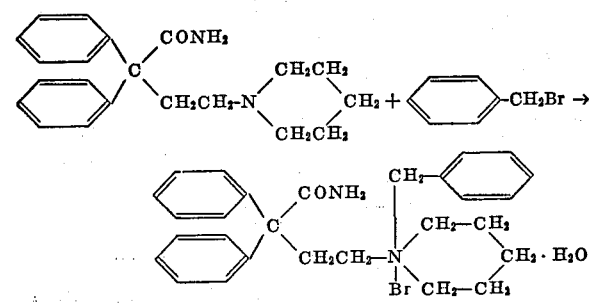

One and one-half grams of alpha, alpha-diphenyl-gamma-(1-piperidyl)-butyramide was dissolved in a minimum (100 ml.) of hot acetonitrile, treated with 1 ml. of benzyl bromide (theory 0.56 ml.) and refluxed for twenty-four hours. Dilution of the cooled mixture with 400 ml. of dry ether caused 1.7 g. of solid to separate; M. P. 179–181° C. Recrystallization from water after charcoal treatment produced white microcrystals, M. P. 180–181.5° C.; yield 1.2 g.

Analysis.—Calculated for $C_{28}H_{33}BrN_2O \cdot H_2O$:

|   | Calculated | Found |
|---|---|---|
| C | 65.7 | 66.1 |
| H | 6.88 | 6.43 |

Example 15.—1-(gamma-carbamyl-gamma, gamma-diphenylpropyl)-1-methylpyrrolidinium iodide

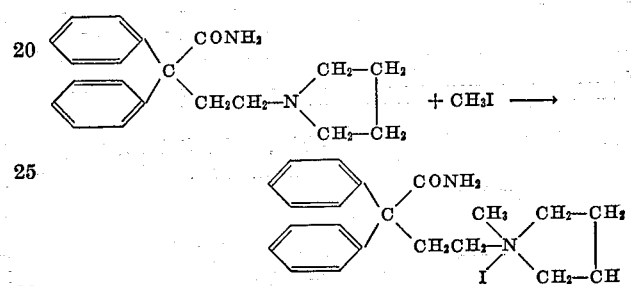

A mixture of 2 g. of alpha, alpha-diphenyl-gamma-(1-pyrrolidyl)-butyramide, 35 ml. of anhydrous isopropyl alcohol and 2 ml. of methyl iodide was protected from moisture and refluxed overnight. Dilution with dry ether to a volume of 250 ml. caused the yellow product to precipitate. It was dissolved in a minimum of absolute alcohol, treated with decolorizing charcoal, filtered and the filtrate was diluted with ethyl acetate to a volume of 125 ml. Cooling caused 2.1 g. of pale yellow crystals, M. P. 101–103° C. to separate from solution. After desiccation in vacuo over phosphorous pentoxide, a sample gave the following analysis:

Analysis.—Calculated for $C_{21}H_{27}IN_2O$:

|   | Calculated | Found |
|---|---|---|
| C | 56.0 | 55.8 |
| H | 6.04 | 6.16 |

Example 16.—Gamma-carbamyl-gamma-phenylpropyl methyl diethylammonium iodide

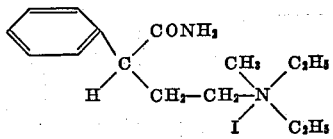

To a solution of 7.1 grams of gamma-carbamyl-gamma-phenylpropyl diethylamine in 40 ml. of isopropyl alcohol is added 2.6 ml. of methyl iodide. An exothermic reaction occurs, and an oil separates on cooling. This oil slowly solidifies, and the solid material is collected by filtration. Recrystallization from a mixture of methyl alcohol and ether gives 10.0 grams of gamma-carbamyl-gamma-phenylpropyl methyl diethylammonium iodide, M. P. 172.0–173.0° C. (melts sharply at 152° C. and then resolidifies).

Analysis.—Calculated for $C_{15}H_{25}ON_2I$:

|   | Calculated | Found |
|---|---|---|
| C | 47.9 | 47.8 |
| H | 6.7 | 6.7 |

*Example 17. — Gamma-carbamyl-gamma-phenylpropyl triethylammonium iodide*

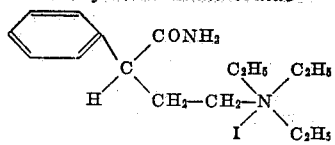

A solution of 7.1 grams of gamma-carbamyl-gamma-phenylpropyl diethylamine and 3.3 ml. of ethyl iodide in 40 ml. of isopropyl alcohol is refluxed for 1.5 hours. Dilution of the reaction mixture with a small amount of ether induces crystallization of the quaternary. The material is collected by filtration and recrystallized from a mixture of methyl alcohol and ether to give 7.9 grams of gamma - carbamyl - gamma - phenylpropyl triethylammonium iodide, M. P. 186.5–187.5° C.

*Analysis.*—Calculated for $C_{16}H_{27}ON_2I$.

|   | Calculated | Found |
|---|---|---|
| C | 49.2 | 49.1 |
| H | 7.0 | 7.1 |

*Example 18.—Delta-carbamyl-delta, delta-diphenyl-beta, beta-dimethylbutyl trimethylammonium iodide*

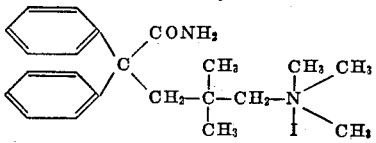

A solution of 6.5 grams of delta-carbamyl-delta, delta-diphenyl-beta, beta-dimethylbutyl dimethyl amine and 6.2 ml. of methyl iodide in 25 ml. of isopropyl alcohol is refluxed for two hours. On cooling, a gum separates, which gradually solidifies. The solid material is collected by filtration and recrystallized from a mixture of methyl alcohol and ether to give 8.2 grams of delta-carbamyl-delta, delta-diphenyl-beta, beta-dimethylbutyl trimethylammonium iodide, M. P. 211.0–212.5° C.

*Analysis.*—Calculated for $C_{22}H_{31}ON_2I$:

|   | Calculated | Found |
|---|---|---|
| C | 56.6 | 56.7 |
| H | 6.7 | 6.7 |

*Example 19. — Gamma-carbamyl-gamma, gamma-diphenyl-alpha-methylpropyl ethyl dimethylammonium iodide*

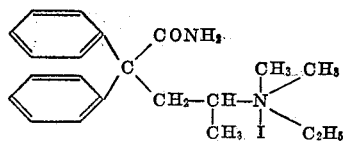

Gamma - carbamyl - gamma, gamma - diphenyl - alpha-methylpropyl dimethylammonium hydrogen sulfate monohydrate (16.5 grams) is shaken with an excess of 10% sodium hydroxide solution, and the free base extracted into chloroform. The extracts are combined and the solvent stripped. The residual solid is dissolved in 125 ml. of hot methyl alcohol and treated with 12.5 grams of ethyl iodide. After twenty hours refluxing, the solvent is evaporated under reduced pressure. Recrystallization of the solid residue from methyl alcohol gives 6.0 grams of gamma - carbamyl - gamma, gamma-diphenyl-alpha-methylpropyl ethyl dimethylammonium iodide, M. P. 192.0–192.5° C.

*Analysis.*—Calculated for $C_{21}H_{29}ON_2I$:

|   | Calculated | Found |
|---|---|---|
| C | 55.8 | 56.4 |
| H | 6.5 | 6.6 |

*Example 20. — Gamma - carbamyl - gamma, gamma-diphenylpropyl methyl diethylammonium chloride*

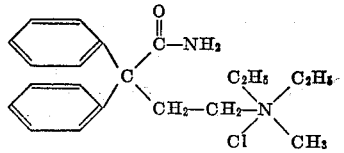

An excess of concentrated hydrochloric acid is added to an aqueous solution of 59.4 grams of silver nitrate. The precipitated silver chloride is collected by filtration and washed successively with several portions of water and then methyl alcohol. The silver chloride thus prepared is added to a stirred solution of 116.2 grams of gamma-carbamyl-gamma, gamma-diphenylpropyl methyl diethylammonium iodide isopropylate in 400 ml. of warm methyl alcohol. The reaction mixture is refluxed for 16 hours and then filtered hot to remove the silver iodide. The filtrate is stripped of solvent and the residue crystallized from a mixture of isopropyl alcohol and ether. Several recrystallizations afford 57.0 grams of gamma-carbamyl-gamma, gamma-diphenylpropyl methyl diethylammonium chloride, M. P. 217.5–218.5° C.

*Analysis.*—Calculated for $C_{21}H_{29}ON_2Cl$:

|   | Calculated | Found |
|---|---|---|
| C | 69.9 | 69.8 |
| H | 8.0 | 8.1 |

*Example 21.—Gamma-carbamyl-gamma, gamma-diphenylpropyl triethylammonium chloride*

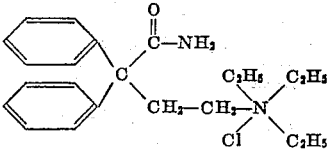

According to the procedure described in Example 20, 102.5 grams of gamma-carbamyl-gamma, gamma-diphenylpropyl triethylammonium iodide is treated with silver chloride. There is obtained 65.2 grams of gamma-carbamyl-gamma, gamma-diphenylpropyl triethylammonium chloride dihydrate, M. P. 198.5–200.0° C. (recrystallized from isopropyl alcohol).

*Analysis.*—Calculated for $C_{22}H_{31}ON_2Cl \cdot 2H_2O$:

|   | Calculated | Found |
|---|---|---|
| C | 64.3 | 64.3 |
| H | 8.6 | 8.6 |

The anhydrous material melts at 204.5–206.0° C. (dec.)

*Analysis.*—Calculated for $C_{22}H_{31}ON_2Cl$:

|   | Calculated | Found |
|---|---|---|
| C | 70.5 | 70.4 |
| H | 8.3 | 8.3 |

*Example 22.—Gamma-carbamyl-gamma,gamma-diphenyl - alpha - methylpropyl dimethyl-octadecylammonium bromide.*

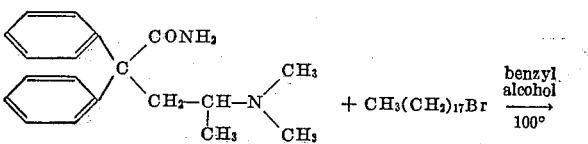

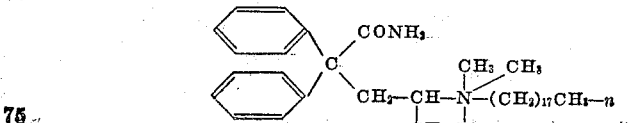

14.8 grams (0.05 mole) of 4-dimethylamino-2,2-diphenylvaleramide, 18.4 grams (0.055 mole) of n-octadecyl bromide and 35 ml. of benzyl alcohol were heated together at steam-bath temperature for 41¾ hours. The benzyl alcohol was removed by distillation under vacuum, and the residue was recrystallized from acetonitrile and again from acetone, raising the melting point of the waxy white solid to 77–92° C.

*Example 23.—(Delta - carbamyl - β,β - dimethyl - delta-phenylbutyl)methylpiperidinium iodide*

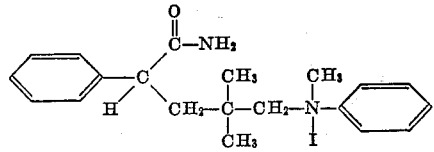

A solution of 7.2 grams of 4,4-dimethyl-5-(1-piperidyl)-2-phenylbutyramide and 14.2 grams of methyl iodide in 100 ml. of methanol is refluxed for twenty hours. On dilution with ether, the quaternary iodide crystallizes. The solid is collected by filtration and recrystallized from methanol-ether; there is obtained 6.1 grams of (delta-carbamyl - β,β - dimethyl - delta - phenylbutyl)methylpiperidinium iodide, M. P. 219.0–220.0° C.

*Analysis.*—Calculated for $C_{19}H_{31}IN_2O$:

|   | Calculated | Found |
|---|---|---|
| C | 53.0 | 53.1 |
| H | 7.3 | 7.4 |

*Example 24.—γ-Dimethylamino-α-methyl-α-phenylbutyramide*

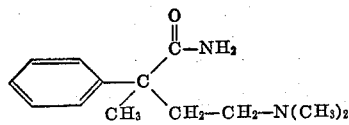

Thirty-five grams of γ-dimethylamino-α-methyl-α-phenylbutyronitrile is added to a cooled mixture of 70 ml. of concentrated sulfuric acid and 7 ml. of water and the resulting clear solution heated on the steam bath for three hours. The solution is poured on ice and basified with ammonium hydroxide. The mixture is extracted several times with chloroform; the chloroform extracts combined, dried, and the solvent evaporated. The residue is recrystallized from cyclohexane to give γ-dimethylamino-α-methyl-α-phenylbutyramide, M. P. 95.0–96.5° C.

*Analysis.*—Calculated for $C_{13}H_{20}N_2O$:

|   | Calculated | Found |
|---|---|---|
| C | 70.9 | 71.1 |
| H | 9.2 | 9.2 |
| N | 12.7 | 12.5 |

*(γ-Carbamyl-γ-phenylbutyl)trimethylammonium iodide*

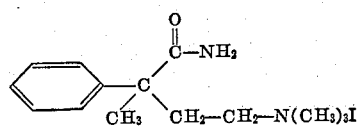

Ten milliliters of methyl iodide is added all at once to a solution of 8.8 grams of γ-dimethylamino-α-methyl-α-phenylbutyramide in 80 ml. of isopropanol. An exothermic reaction sets in and is followed by precipitation of the quaternary iodide. The solid is collected by filtration and recrystallized from a mixture of methyl and isopropyl alcohols to give 9.3 grams of (γ-carbamyl-γ-phenylbutyl)trimethylammonium iodide, M. P. 243.5–245.5° C.

*Analysis.*—Calculated for $C_{14}H_{23}IN_2O$:

|   | Calculated | Found |
|---|---|---|
| C | 46.6 | 46.8 |
| H | 6.4 | 6.3 |

*Example 25.—γ-Diethylamino-α-ethyl-α-phenylbutyramide*

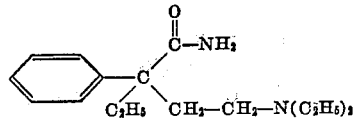

γ - Diethylamino - α - ethyl - α - phenylbutyronitrile (48.8 grams) is added in portions to a cooled mixture of 100 ml. of concentrated sulfuric acid and 10 ml. of water and the resulting solution heated on the steam bath for three hours. The solution is poured on ice and made basic with ammonium hydroxide. The gum which separates is extracted into chloroform and extracts dried and the solvents evaporated. The amide, γ-diethylamino-α-ethyl-α-phenylbutyramide, is obtained as a yellow oil (43.9 grams).

*Analysis.*—Calculated for $C_{16}H_{26}N_2O$:

|   | Calculated | Found |
|---|---|---|
| C | 73.2 | 72.8 |
| H | 10.0 | 10.2 |
| N | 10.7 | 11.1 |

*(γ-Carbamyl-γ-phenylamyl) diethyl methylammonium iodide*

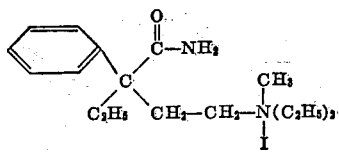

A solution of 14.2 grams of γ-diethylamino-α-ethyl-α-phenyl-butyramide and 15 ml. of methyl iodide in 50 ml. of isopropanol is heated to boiling, then diluted slightly with ethyl acetate. Crystallization proceeds rapidly. The solid is collected by filtration, and recrystallized from ethanol-ethyl acetate. There is obtained 16.4 grams of (γ-carbamyl - γ - phenylamyl)diethyl methylammonium iodide, M. P. 169.5–172.0° C.

*Analysis.*—Calculated for $C_{17}H_{29}IN_2O \cdot H_2O$:

|   | Calculated | Found |
|---|---|---|
| C | 48.4 | 48.2 |
| H | 7.4 | 7.3 |

*(γ-Carbamyl-γ-phenylamyl) triethylammonium iodide*

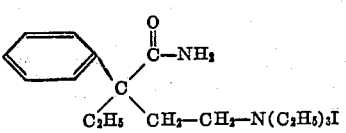

A solution of 14.2 grams of γ-diethylamino-α-ethyl-α-phenylbutyramide and 15 ml. of ethyl iodide in 50 ml. of isopropanol is refluxed for five hours. On cooling, the quaternary iodide crystallizes. The solid is collected by filtration and recrystallized from methanol-ethyl acetate to give 10.5 grams of γ-carbamyl-γ-phenylamyl triethylammonium iodide, M. P. 190.5–192.5° C.

*Analysis.*—Calculated for $C_{18}H_{31}IN_2O$:

|   | Calculated | Found |
|---|---|---|
| C | 51.7 | 51.9 |
| H | 7.5 | 7.6 |
| N | 6.7 | 6.4 |

*Example 26.—Isopropyldimethyl (γ-carbamyl-γ,γ-diphenylpropyl) ammonium iodide*

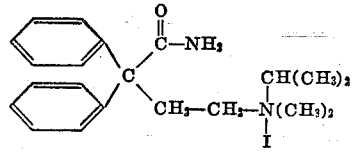

A solution of 42.3 grams of γ-dimethylamino-α,α-diphenylbutyramide and 37.4 grams of isopropyl iodide in 80 ml. of absolute ethanol is refluxed for 40 hours. The solvent is removed by evaporation under reduced pressure and the residue recrystallized from ethanolethyl acetate. There is obtained 35.1 grams of isopropyldimethyl (γ - carbamyl-γ,γ-diphenylpropyl) ammonium iodide, M. P. 193.0–194.0° C.

*Analysis.*—Calculated for $C_{21}H_{29}IN_2O$:

|   | Calculated | Found |
|---|---|---|
| C | 55.8 | 55.5 |
| H | 6.5 | 6.7 |

*Example 27.—Ethyl dimethyl (γ-carbamyl-γ,γ-diphenylpropyl) ammonium bromide*

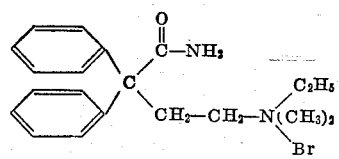

A solution of 27.2 grams of γ-dimethylamino-α,α-diphenylbutyramide and 19.8 grams of ethyl bromide in 40 ml. of methanol is refluxed for 64 hours. The solvent is distilled under reduced pressure and the residual oil triturated with ether. The solid quaternary bromide is collected by filtration and may be recrystallized from isopropanol to give ethyldimethyl (γ-carbamyl-γ,γ-diphenylpropyl) ammonium bromide, M. P. 212.0–213.0° C.

*Analysis.*—Calculated for $C_{20}H_{27}BrN_2O$:

|   | Calculated | Found |
|---|---|---|
| C | 61.4 | 61.6 |
| H | 7.0 | 7.0 |

*Example 28.—Allyldimethyl (γ-carbamyl-γ,γ-diphenylpropyl) ammonium chloride*

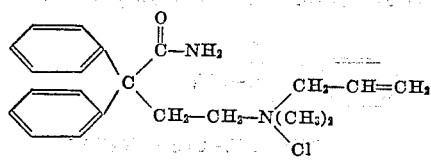

A solution of 25.5 grams of γ-dimethylamino-α,α-diphenylbutyramide and 7.7 grams of allyl chloride in 190 ml. of acetone is refluxed for 16 hours. The solution is cooled and the precipitated quaternary chloride collected by filtration. Recrystallization from isopropanol-ethyl acetate gives 20.0 grams of allyldimethyl (γ-carbamyl-γ,γ-diphenylpropyl) ammonium chloride, M. P. 201.0–201.5° C.

*Analysis.*—Calculated for $C_{21}H_{27}ClN_2O$:

|   | Calculated | Found |
|---|---|---|
| C | 70.3 | 70.0 |
| H | 7.6 | 8.3 |

*Example 29.—γ-Dimethylamino-α-phenyl-α-2-pyridylbutyramide*

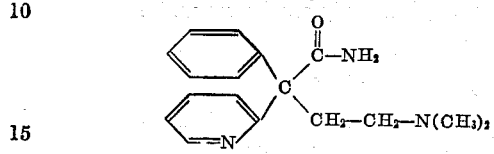

Eighty-four grams of γ-dimethylamino-α-phenyl-α-2-pyridylbutyronitrile is heated on the steam bath for three hours with 300 ml. of concentrated sulfuric acid and 30 ml. of water. The solution is poured on ice and basified with ammonium hydroxide. The basic mixture is extracted three times with ether; the extracts combined, dried, and the solvent evaporated. There was obtained 68 grams of γ-dimethylamino-α-phenyl-α-2-pyridylbutyramide as a thick gum.

*Trimethyl (γ-carbamyl-γ-phenyl-γ-2-pyridylpropyl) ammonium iodide*

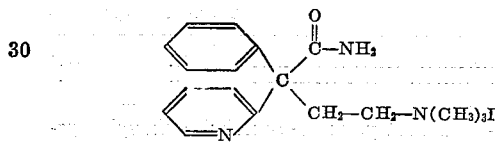

Five milliliters of methyl iodide is added to a warm solution of 10 grams of γ-dimethylamino-α-phenyl-α-2-pyridylbutyramide in 60 ml. of isopropanol containing one milliliter of water. Seeding and scratching induces crystallization of the quaternary iodide. The solid is collected by filtration and recrystallized from dilute isopropanol, giving 12.2 grams of trimethyl(γ-carbamyl-γ-phenyl-γ-2-pyridylpropyl)ammonium iodide, M. P. 178° C. dec.

*Analysis.*—Calculated for $C_{19}H_{24}IN_3O$:

|   | Calculated | Found |
|---|---|---|
| C | 50.8 | 51.1 |
| H | 5.7 | 5.9 |

*Example 30.—γ - Diethylamino - α - phenyl - α - 2-pyridylbutyramide*

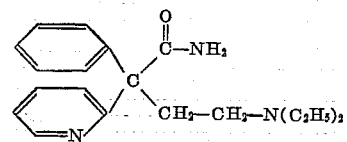

Ninety grams of γ-diethylamino-α-phenyl-α-2-pyridylbutyronitrile is dissolved in a mixture of 300 ml. of concentrated sulfuric acid and 30 ml. of water and the resulting solution heated on the steam bath for three hours. The solution is poured on ice and made basic with ammonium hydroxide. The basic amide is removed by several extractions with ether. The extracts are combined, dried, and evaporated to dryness; the residue solidifies. On recrystallization from petroleum ether there is obtained 64 grams of γ-diethylamino-α-phenyl-α-2-pyridylbutyramide, M. P. 63–67° C.

*Analysis.*—Calculated for $C_{19}H_{25}N_3O$:

|   | Calculated | Found |
|---|---|---|
| C | 73.3 | 73.3 |
| H | 8.1 | 8.3 |

*Diethylmethyl (γ - carbamyl - γ - phenyl - γ - 2 - pyridylpropyl) ammonium iodide*

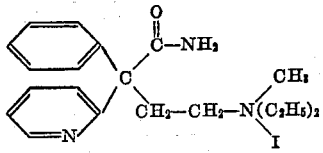

A solution of 10 grams of γ-diethylamino-α-phenyl-α-2-pyridylbutyramide and 11.4 grams of methyl iodide in 60 ml. of isopropanol containing one milliliter of water is allowed to stand overnight at room temperature. Dilution with 200 ml. of ether causes separation of an oil. The liquid is decanted and the oil dissolved in hot dilute isopropanol. Cooling causes crystallization of the quaternary iodide. The solid is collected by filtration and recrystallized from dilute isopropanol, giving 13.2 grams of diethylmethyl (γ - carbamyl - γ - phenyl - γ - 2 - pyridylpropyl) ammonium iodide, M. P. 158° C. dec.

*Analysis.*—Calculated for $C_{20}H_{28}IN_3O$:

|   | Calculated | Found |
|---|---|---|
| C | 53.0 | 53.1 |
| H | 6.2 | 6.3 |
| N | 9.3 | 9.0 |

*Example 31.—N,N - diethyl - α,α - diphenyl - γ - (1-piperidyl)butyramide*

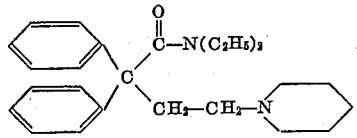

A solution of 36.6 grams of diethylamine in benzene is added to a benzene solution of 50.0 grams of diphenylacetyl chloride and the resulting mixture refluxed for three hours. The reaction mixture is extracted with water and the benzene layer evaporated to dryness. Recrystallization of the residue gives 48 grams of N,N-diethyldiphenylacetamide, M. P. 67.5–69.0° C.

A solution of 38 grams of the N,N-diethyldiphenylacetamide in 160 ml. of xylene is refluxed for five hours with 3.4 grams of lithium amide. To this mixture is then added dropwise a solution of 29.5 grams of β-piperidylethyl chloride in 100 ml. of xylene. The reaction mixture is refluxed overnight, cooled, and poured into water. The xylene layer is separated and extracted twice with dilute hydrochloric acid. The acid extracts are neutralized with alkali. An oil separates, which solidifies. Recrystallization of the solid from petroleum ether gives 25.8 grams of N,N - diethyl - α,α - diphenyl - γ - (1 - piperidyl)butyramide, M. P. 106.0–107.0° C.

*Analysis.*—Calculated for $C_{25}H_{34}N_2O$:

|   | Calculated | Found |
|---|---|---|
| C | 79.3 | 79.2 |
| H | 9.0 | 9.1 |

This base is quaternized, e. g. with alkyl halides such as methyl iodide and ethyl bromide, in the manner of the above examples.

*Example 32.—α - Butyl - γ - diethylamino - α - phenylbutyramide*

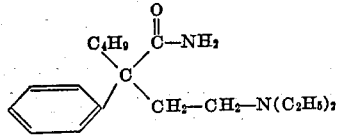

Thirty-five grams of α - butyl - γ - diethylamino - α - phenylbutyronitrile is added to a cooled solution of 65 ml. of concentrated sulfuric acid and 6.5 ml. of water. The reaction mixture is heated on the steam bath for 3.5 hours, then poured on ice and basified with ammonium hydroxide. The liberated basic amide is extracted into ether, the ether extracts combined and dried. Evaporation of the solvent leaves α - butyl - γ - diethylamino - α - phenylbutyramide as viscous yellow oil (22.7 grams).

*Analysis.*—Calculated for $C_{18}H_{30}N_2O$:

|   | Calculated | Found |
|---|---|---|
| C | 74.4 | 74.6 |
| H | 10.4 | 10.1 |
| N | 9.7 | 9.9 |

The base is quaternized in the manner described above.

*Example 33.—α - Δ' - cyclohexenyl - γ - dimethylamino - α - phenylbutyramide*

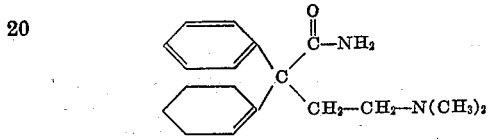

A solution of 26.8 grams of α-Δ'-cyclohexenyl-γ-dimethylamino-α-phenylbutyronitrile in 50 ml. of concentrated sulfuric acid and 5 ml. of water is heated on the steam bath for two hours. The solution is poured on ice and made basic with ammonium hydroxide. The gum which separates is taken up in chloroform, the extracts dried, and the solvent evaporated. There is obtained 19.9 grams of α-Δ'cyclohexenyl-γ-dimethylamino-α-phenylbutyramide as a light yellow glass.

*Analysis.*—Calculated for $C_{18}H_{26}N_2O$:

|   | Calculated | Found |
|---|---|---|
| C | 75.5 | 75.4 |
| H | 9.1 | 9.0 |
| N | 9.8 | 9.4 |

The base is quaternized in the manner described above.

*Example 34.—Benzyl (γ-carbamyl-γ,γ-diphenylpropyl) dimethylammonium chloride*

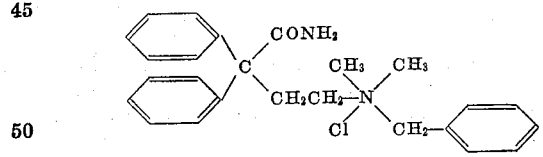

α,α-Diphenyl-γ-dimethylaminobutyramide (7.1 g.; 0.025 mole) was dissolved in 25 ml. hot isopropyl alcohol, 12 ml. (13.2 g.; 0.104 mole) benzyl chloride was added and the solution was refluxed for 42 hours. After removal of the solvent by distillation in vacuo, benzyl-(γ-carbamyl-γ,γ-diphenylpropyl)dimethylammonium chloride solidified to a glassy solid which was crystallized from ethanol-ether and then from isopropyl alcohol containing a little ethanol, M. P. 213°–215° C. with decomposition.

*Analysis.*—Calculated for $C_{25}H_{29}ClN_2O$:

|   | Calculated | Found |
|---|---|---|
| C | 73.5 | 73.2 |
| H | 7.15 | 7.49 |

*Example 35.—γ-Diisopropylamino-α,α-diphenylbutyramide*

γ-Diisopropylamino-α,α-diphenylbutyronitrile (60 g.) was added in several portions to a mixture of sulfuric acid (150 ml.) and water (15 ml.) and the solution was heated 3½ hours on the steam bath and then poured on ice and made basic with NH₄OH. The γ-diisopropylamino-α,α- diphenylbutyramide precipitated as a solid, which was taken up in methylene chloride from an aqueous slurry. The methylene chloride was separated and dried by filtering through anhydrous $K_2CO_3$. The solvent was removed by distillation, leaving the amide which was crystallized from Skellysolve B five times and found then to have M. P. 87.0°–88.5° C.

*Analysis.*—Calculated for $C_{22}H_{30}N_2O$:

|  | Calculated | Found |
|---|---|---|
| C | 78.06 | 78.3 |
| H | 8.93 | 9.18 |

γ-*Diisopropylamino-α,α-diphenyl-butyramide methiodide*

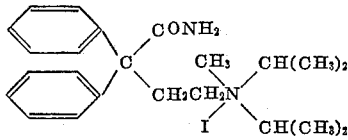

γ-Diisopropylamino-α,α-diphenylbutyramide in propanol was refluxed four hours in the presence of excess methyl iodide. Upon dilution of the solution with ethylacetate (100 ml. per 50 ml. isopropyl alcohol) and cooling γ-di-isopropylamino-α,α-diphenylbutyramide methiodide precipitated, was collected by filtration and recrystallized (9.0 g.) by dissolving in a hot mixture of 100 ml. isopropylalcohol and 10 ml. methanol and then diluting with 90 ml. Skellysolve B, to give 8.3 g. recrystallized product, M. P. 182°–184° C.

*Analysis.*—Calculated for $C_{23}H_{33}IN_2O$:

|  | Calculated | Found |
|---|---|---|
| C | 57.50 | 56.7 |
| H | 6.92 | 7.27 |

*Example 36.*—γ-*Di-isopropylamino-α,α-diphenylvaleronitrile and* γ-*di-isopropylamino-α,α-diphenyl-β-methylbutyronitrile*

1-di-isopropylamino-2-chloropropane hydrochloride (71.8 g.; 0.336 mole) was stirred with 100 ml. toluene and 45 ml. of 40% sodium hydroxide; after the salt had been completely decomposed, the toluene layer was decanted and the aqueous layer was stirred in turn with three 50 ml. portions of toluene. The combined toluene solution was dried by shaking over anhydrous $K_2CO_3$ for three hours; this solution was filtered and added dropwise over one hour to a hot, stirred mixture prepared by stirring diphenylacetonitrile (77.3 g.; 0.4 mole) and lithium amide (9.2 g.; 0.4 mole) in 250 ml. refluxing toluene for three hours. The mixture was stirred and refluxed for 24 hours and water was added to dissolve the lithium chloride. The aqueous layer was discarded and the toluene layer was shaken twice with dilute hydrochloric acid. The acid extracts were separated; made basic with sodium hydroxide and the basic material which separated was extracted into ether. The combined ether extracts were shaken with saturated salt solution, and the ether filtered through anhydrous $K_2CO_3$ and the solvent evaporated to leave an oil which was distilled at 159°–184° C. (mainly about 184°) at 0.4 mm., giving 84.1 g.

*Analysis.*—Calculated for $C_{23}H_{30}N_2$:

|  | Calculated | Found |
|---|---|---|
| C | 82.58 | 81.0 |
| H | 9.04 | 8.66 |

The oil was taken up in 200 ml. hot Skellysolve B, allowed to stand in the cold, and filtered, the filtrate being set aside.

The precipitate of γ-di-isopropylamino-α,α-diphenyl-valeronitrile collected by this filtration was recrystallized four times from Skellysolve B, M. P. 97.0°–100.0° C.

*Analysis.*—Calculated for $C_{23}H_{30}N_2$:

|  | Calculated | Found |
|---|---|---|
| C | 82.6 | 82.4 |
| H | 9.04 | 8.80 |

A small portion was converted to the sulfate by addition of concentrated sulfuric acid to an ethanol solution of the amine followed by dilution with ether; M. P. 210.0°–212.0° C. after recrystallization from isopropyl alcohol-ether.

*Analysis.*—Calculated for $C_{23}H_{30}N_2 \cdot H_2SO_4$:

|  | Calculated | Found |
|---|---|---|
| C | 63.85 | 64.2 |
| H | 7.46 | 7.74 |
| N | 6.48 | 6.44 |

The original Skellysolve mother liquor set aside above, after removal of a second crop of crystals after further standing in the cold, was evaporated under reduced pressure to give γ-di-isopropylamino-α,α-diphenyl-β-methylbutyronitrile as an oil. Ten grams of this oil was used in Example 37 below. The rest of the oil was taken up in about 150 ml. Skellysolve A, cooled to −50° C. and the γ-di-isopropylamino-α,α-diphenyl-β-methylbutyronitrile which precipitated was collected by filtration and found to melt at about 93.5°–97.5° C. after recrystallization from isopropyl alcohol.

*Example 37.*—γ-*Diisopropylamino-α,α-diphenyl-β-methylbutyramide*

γ-Diisopropylamino-α,α-diphenyl-β-methylbutyronitrile (10 g.) was added to a mixture of sulfuric acid (25 ml.) and water 2.5 ml. and the resulting solution was heated for 3½ hours on the steam bath, poured on ice and made basic with $NH_4OH$, precipitating the product, γ-diisopropylamino-α,α-diphenyl-β-methylbutyramide as a gum, which was separated and extracted with methylene chloride. The extracts were filtered through $Na_2SO_4$ and the solvent evaporated to leave the product as an oil which was dissolved in 200 ml. Skellysolve A, filtered and allowed to stand for two days. The product precipitated as large crystals, M. P. 114°–118° C. after recrystallizations from aqueous isopropyl alcohol.

*Analysis.*—Calculated for $C_{23}H_{32}N_2O$:

|  | Calculated | Found |
|---|---|---|
| C | 78.36 | 78.3 |
| H | 9.15 | 9.15 |
| N | 7.95 | 8.00 |

*Example 38.*—γ-*Diisopropylamino-α,α-diphenylvaleramide*

γ-Diisopropylamino-α,α-diphenylvaleronitrile (18.0 g.) (Example 36 above) was slowly dissolved in a mixture of sulfuric acid (50 ml.) and water (5 ml.) and the resulting solution was heated for 3½ hours on the steam bath, poured on ice and made basic with $NH_4OH$, precipitating the product γ-diisopropylamino-α,α-diphenylvaleramide as a white gum. The water was decanted and the product dissolved in hot isopropyl alcohol, filtered, and poured into water to precipitate 8.0 g. product, M. P. 192.5°–194° C. (softens about 175° C.) after repeated recrystallization from aqueous methanol and from isopropyl alcohol.

*Analysis.*—Calculated for $C_{23}H_{32}N_2O$:

|   | Calculated | Found |
|---|---|---|
| C | 78.36 | 78.2 |
| H | 9.15 | 9.30 |

I do not limit myself to the specifically mentioned times, temperatures, quantities, chemicals or steps of procedure, as these are given simply to clearly describe this invention as set forth in my specifications and claims, and they may be varied without going beyond the scope of my invention.

I claim:

1. A compound selected from the group consisting of γ - carbamyl - γ,γ - diphenylpropyl - trimethylammonium halides, γ - carbamyl - γ,γ - diphenylpropyl - dimethylethylammonium halides, γ-carbamyl-γ,γ-diphenylpropyl-methyldiethylammonium halides, γ-carbamyl-γ,γ-diphenylpropyl-triethylammonium halides and γ-carbamyl-γ,γ-diphenylpropyl-methyldiisopropylammonium halides, said halides being selected from the group consisting of chloride, bromide and iodide.

2. γ - Carbamyl - γ,γ - diphenylpropyl - dimethylethylammonium bromide.

3. γ-Carbamyl-γ,γ-diphenylpropyl-trimethylammonium iodide.

4. γ - Carbamyl - γ,γ - diphenylpropyl - methyldiethylammonium chloride.

5. γ-Carbamyl-γ,γ-diphenylpropyl - triethylammonium iodide.

6. γ - Carbamyl - γ,γ - diphenylpropyl - methyldiisopropylammonium iodide.

References Cited in the file of this patent

UNITED STATES PATENTS

| 2,009,144 | Miescher | July 23, 1935 |
| 2,437,545 | Martin | Mar. 9, 1948 |
| 2,647,926 | Speeter | Aug. 4, 1953 |

FOREIGN PATENTS

| 504,085 | Belgium | July 14, 1951 |
| 1,054,240 | France | Oct. 7, 1953 |
| 882,283 | France | May 28, 1943 |
| 884,740 | France | Aug. 25, 1943 |

OTHER REFERENCES

Cheney et al.: "J. Org. Chem.," vol. 17, May 1952, pp. 770–776.

Hoekstra: "J. Pharm. and Exptl. Therap.," vol. 98 (1950) p. 14.

Jensen: Acta Chemica Scand., vol. 2, pp. 381–384, 1948.